Aug. 9, 1966 R. L. WYCKOFF 3,265,986

VARIABLE FREQUENCY OSCILLATORS

Filed April 25, 1962 4 Sheets-Sheet 1

INVENTOR
ROBERT L. WYCKOFF

BY Robert T Dunn

AGENT

INVENTOR
ROBERT L. WYCKOFF
BY Robert T Dunn
AGENT

INVENTER
ROBERT L. WYCKOFF
BY Robert T Dunn
AGENT

INVENTOR
ROBERT L. WYCKOFF
BY Robert T Dunn
AGENT

United States Patent Office 3,265,986 Patented August 9, 1966

3,265,986

VARIABLE FREQUENCY OSCILLATORS

Robert L. Wyckoff, Holliston, Mass., assignor to Raytheon Company, Lexington, Mass., a corporation of Delaware Filed Apr. 25, 1962, Ser. No. 190,081
11 Claims. (Cl. 331—14)

This invention relates to variable frequency oscillators and more particularly to a system responsive to the output of a fixed frequency generator for producing a variable frequency in response to a command signal.

Coherent radar systems for detecting the motion of a target or for detecting the relative motion between the radar source and a target often employ variable frequency filters by which Doppler shifted echo signals from the target are tracked in frequency. Since the frequency of the echo is indicative of closing or departing rate of the target, the frequency of the filter which tracks the echo frequency is indicative of target rate, and is useful to identify and keep track of any given target. Heretofore, such variable frequency filters have included a variable frequency generator producing an output which is mixed with the echo signal. The output of the mixer is detected to produce an error signal which is fed back to the variable frequency generator to control the frequency therefrom. Such filters operate in an analog fashion, and the variable frequency generator usually consists of an oscillator having a tuned circuit in which the inductance or capacitance is electrically varied by the feedback error signal to vary the tuning in a direction which tends to reduce the magnitude of the error signal. Heretofore, such analog type variable frequency filters have been limited in accuracy by the precision with which the variable frequency generator can be controlled to produce a precisely determined frequency output. Accordingly, it is one object of the present invention to provide an improved variable frequency generator whose frequency can be precisely controlled as required to track the frequency of echoes from a moving target.

It is another object to provide a digital controlled variable frequency oscillator capable of tracking Doppler shifts on the order of 100,000 c.p.s. with a precision of less than one-half c.p.s. error.

It is a principal feature of the present invention to vary a fixed frequency in response to a frequency error signal by successively shifting the phase of the fixed frequency by amounts which represent the number and fractions of cycles of the error frequency which have occurred during predetermined time intervals. Embodiments of the invention include means for counting the number and fraction of cycles of the error frequency and shifting phase of the fixed frequency during predetermined intervals dependent upon such fraction of cycles.

One feature of the present invention is based on the fact that a train of pulsed sinusoids at a fixed frequency $f_a$ is not easily distinguished from a train of pulsed sinusoids at a variable frequency $f_b$ provided that $f_a - f_b$ is no greater than twice the pulse rate frequency (PRF) divided by the duty cycle. In other words, for many purposes a pulsed sinusoid of one frequency is useful to represent a pulsed sinusoid of another frequency if during each pulse the average phase of the sinusoid of the one frequency is substantially coherent with the phase of corresponding pulsed sinusoids of the other frequency. In one embodiment of the invention, this principle is employed by successively shifting the phase of pulses of sinusoid from a fixed frequency oscillator by predetermined amounts so that, as a result, the pulsed output from the oscillator appears shifted in frequency. It is another feature to employ binary digital components to compute the amounts of the successive phase shifts. The digital equipment for accomplishing this includes means for generating a pulse rate representative of the frequency difference $f_a - f_b$, a binary counter for counting these pulses and storing a binary number representative of the cumulated frequency difference between the fixed frequency $f_a$ and the varying frequency $f_b$, and a second binary counter for counting clock pulses to represent time. The output $f_a$ of a fixed frequency oscillator is interrupted by signals from a PRF generator. These same signals also trigger a multiplier which multiplies the numbers in the two counters and, in turn, feeds a register which stores the product thereof. This stored product is representative of the number and fraction of cycles of the frequency difference ($f_a - f_b$) which have occurred since initiation of operation. The fraction of cycles stored in this register serves to control a variable phase shifter to which the pulses of $f_a$ at the established PRF are fed. The output of the variable phase shifter includes bursts of sinusoid of $f_a$ at the PRF, successive bursts of which are shifted in phase so that the signal has the appearance and effect, for many purposes, of a sinusoid $f_b$ at the same PRF.

Another embodiment of the present invention is based on a principle that a continuous wave signal at a fixed frequency $f_a$ can be made to appear as a continuous wave at a variable frequency $f_b$ by continually shifting the phase of the signal $f_a$ in such a manner that the frequency shift or the rate of change of the phase shift of $f_a$ is substantially equal to $f_a - f_b$. This operation is subject to certain limitations which will be described below. The principle is incorporated in equipment including two digital number registers. One register contains a number representative of the integral of a signal representing the difference $f_a - f_b$, and the other register contains a number representative of expired time. The outputs of these registers are combined in suitable binary circuitry to produce an average pulse rate which is proportional to the product of the numbers in the registers. This pulse rate is fed to a second binary counter. Accordingly, the number in the second binary counter represents the number and fraction of cycles of a frequency $f_a - f_b$ which have expired since the beginning of the operation. The binary value stored in this second counter which is representative of the *fraction* of a cycle serves to control a variable phase shifter which shifts the phase of the output of a fixed frequency generator generating a frequency $f_a$. The output of this phase shifter is then $f_b$.

Other features and objects of the present invention are more apparent from the following specific description taken in conjunction with the figures in which.

Figure 1:
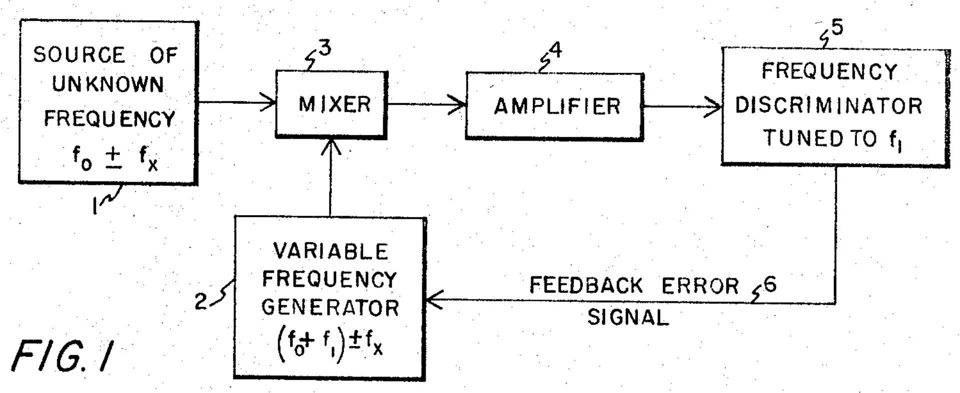
FIG. 1 illustrates a typical variable frequency filter such as employed in moving target radar systems and including a variable frequency generator for tracking the frequency of radar echo signals.

FIG. 1 illustrates a typical variable frequency filter system such as employed in a moving target radar system. The radar system receiver is represented by the source of unknown frequency 1 and the unknown frequency is designated $f_0 \pm f_x$, $f_x$ being, for example, the unknown Doppler shift. This unknown frequency is the frequency which is tracked by the output of a variable frequency generator. As shown in FIG. 1, the unknown frequency, $f_0 \pm f_x$, and the output of the variable frequency generator 2 denoted $f_0+f_1 \pm f_x$ are both applied to a mixer 3. Mixer 3 is preferably a carrier suppressed single side band mixer producing an output frequency which is the difference between the unknown frequency and the variable frequency. The output of mixer 3 is amplified by an amplifier 4 and applied to a frequency discriminator 5 which is tuned to $f_1$. The output of the frequency discriminator 5 is, therefore, a signal level representative of the difference between the two frequencies applied to the mixer and is herein denoted an error signal. This error signal is fed to the variable frequency generator 2 to control the frequency output thereof, thus completing a null type servoloop in which the magnitude of the feedback signal represents an unknown variable input plus a constant.

When the system is nulled, the output of the variable frequency generator 2 is $f_0+f_1 \pm f_x$. In other words, the output of the variable frequency generator 2 tracks the unknown frequency when the system is nulled, and while the two frequencies are not equal, they differ from each other by the fixed known amount $f_1$. The variable frequency generator 2 includes a fixed frequency oscillator generating a frequency equivalent to $f_a$, mentioned above, and produces an output frequency equivalent to $f_b$, mentioned above. The frequency $f_b$ is equivalent to $$f_0+f_1 \pm f_x$$

when the system is nulled. The present invention includes a number of different structures for performing the function of the variable frequency generator 2 shown in the filter system of FIG. 1.

Figure 2:
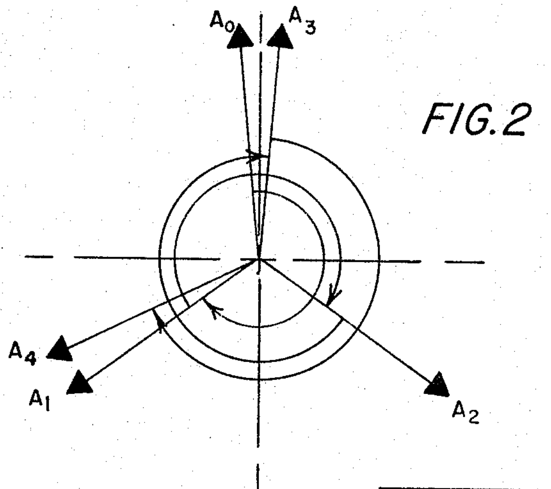
FIG. 2 is a vector diagram to illustrate a principle of the present invention to show how predetermined phase shifts of successive bursts of sinusoid of a given frequency change the given frequency.
Figure 3:
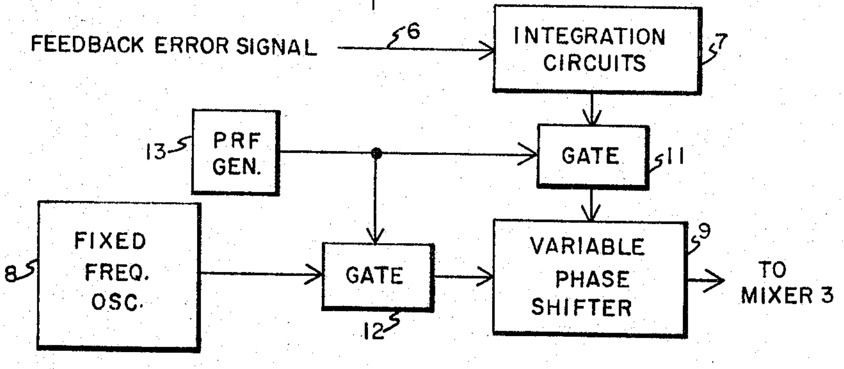
FIG. 3 is a simple block diagram to illustrate a principal feature of the invention.

If, for example, the radar system employing the variable frequency filter is a pulsed system, then the basic components of the variable frequency generator 2, in accordance with features of the present invention, are illustrated in FIG. 3. These components include an integration circuit 7 responsisve to the feedback error signal 6 which is produced by the output of the discriminator 5, a fixed frequency oscillator 8 producing the frequency $f_0+f_1$ and a variable phase shifter 9 for shifting the phase of the output of the fixed frequency oscillator in response to a control signal from the integration circuit 7. Gating circuits 11 and 12 are provided for gating each of the inputs to the variable phase shifter 9, and each of these gates is controlled by a signal derived from the pulse rate frequency of the radar system. Accordingly, the gates are controlled by a PRF gating signal generator 13. In accordance with principles of the present invention, described briefly above as one of the features, pulses of sinusoid at a frequency $f_0+f_1$ from gate 12 are successively shifted in phase by predetermined amounts. These predetermined amounts of phase shift are each representative of the number and fraction of cycles of a frequency error signal which have occurred since initiation of operation of the system. Accordingly, each successive burst of sinusoid of frequency $f_0+f_1$ from the gate 12 is shifted by a computed fraction of a cycle which is equal to the fractional part of the number of cycles of a difference frequency $f_x$ which have occurred since initiation of operation of the system. This operation is illustrated diagrammatically in a vector diagram of FIG. 2.

In FIG. 2 the heavy vector denoted $A_0$ represents the frequency of the fixed frequency oscillator. In other words, it represents the frequency $f_0+f_1$. If the vector $A_0$ is rotated at an angular rate equal to the unknown frequency $f_x$, and if the PRF rate is greater than the frequency $|f_x|$, then a sample of the position of the vector $A_0$ during corresponding intervals of each duty cycle of the radar system would reveal that the phase of the frequency $f_0+f_1$ represented by $A_0$ successively shifts. For example, if the phase at time zero is indicated by the position of vector $A_0$, then at time 1 it would be indicated by vector $A_1$; at time 2 it would be indicated by vector $A_2$; at time 3 by vector $A_3$, etc. Accordingly, the phase angles of each of these vectors indicate the phase shifts that successive bursts of sinusoid of the frequency $f_0+f_1$ must experience so that these successive bursts of sinusoid appear for many applications, including the one illustrated herein, as bursts of sinusoid of a frequency $f_0+f_1+f_x$. If the PRF is less than $f_x$, then each of the successive vectors such as $A_2$ and $A_3$ would be separated from each other by more than one cycle of revolution about the coordinate system shown in FIG. 2. The number of whole cycles, however, could be ignored, and the phase shift imposed need be only that indicated by the fraction of a whole cycle represented by the angle between each of these vectors and $A_0$. In either case, whether the PRF is greater or less than $|f_x|$, the variable phase shifter 9 must shift phase of successive bursts of sinusoid by predetermined fractions of a whole cycle of the frequency $|f_x|$.

Figure 4:
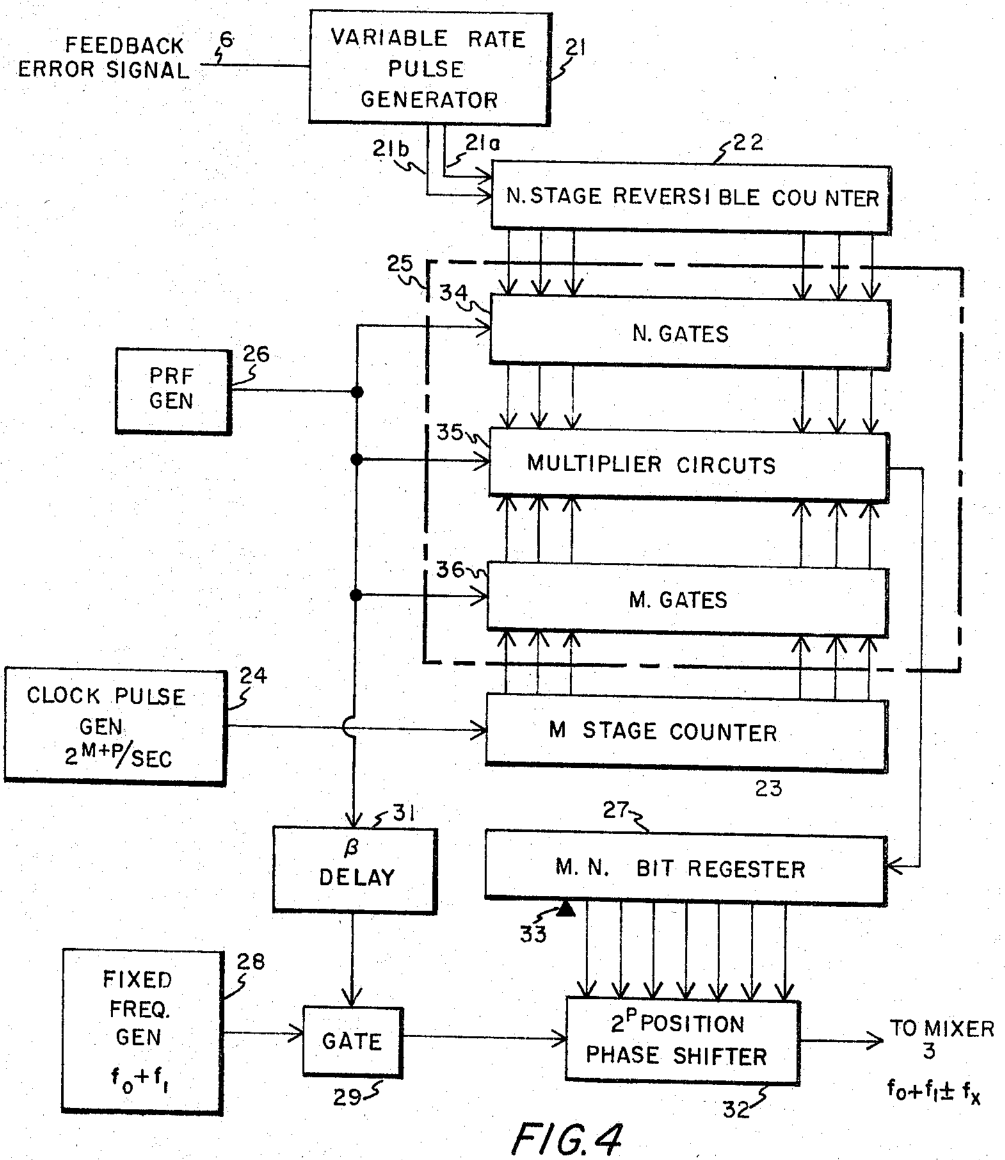
FIG. 4 is a block diagram of a digital computer system for controlling the output of a fixed frequency oscillator $f_a$ and shifting phase of successive bursts of sinusoid therefrom to simulate bursts of a frequency $f_b$.

Turning next to FIG. 4, there is shown an embodiment of the invention including binary digital components for performing the functions indicated in FIG. 3; the integration circuit 7 includes, for example, a variable rate pulse generator 21 responsive to the feedback error signal 6 producing a pulse rate in line 21*a* or 21*b* which is directly proportional to the magnitude of the feedback signal 6. The sign of the pulses is indicated by the line 21*a* or 21*b* in which they appear and is the same as the sign of the feedback error signal. The pulses from generator 21 are applied to N stage reversible counter 22. Reversible counter 22 is of the type sometimes called an "up-down" counter and responds to either of two input rates representing positive or negative values in such a manner that pulses from one input (line 21*a*) increases the magnitude of the binary number stored in the counter, whereas pulses from the other input (line 21*b*) decrease the magnitude of the binary number.

A second M stage binary counter 23 of a conventional type responds to pulses from clock pulse generator 24. Clock pulse generator 24 preferably generates pulses at a rate $2^{M+P}$/seconds. Accordingly, the number stored in M stage counter 23 is representative of time. The numbers stored in the N and M stage counters are applied to a digital multiplier 25 which multiplies one number by the other, the multiplication being initiated by pulses from the PRF generator 26. The product of the multiplication is fed to $M+N$ bit register 27 and stored in that register during the interval between PRF pulses. Accordingly, the number stored in the register 27 represents the number and fraction of cycles of the error frequency $f_x$ which have occurred in the interval since the initiation of operation. This interval is measured by the number stored in the M stage counter 23.

A fixed frequency generator 28 generates the frequency $f_0+f_1$. The output of this generator is gated by gating circuit 29 to produce bursts of sinusoid at the frequency $f_0+f_1$, the bursts occurring at the PRF. This is accomplished by applying a control signal to gate 29 from the PRF generator 26 via a delay line denoted $\beta$ delay 31. The magnitude of the delay 31 is sufficient to permit the multiplication process to occur and to permit the product thereof to be stored in register 27 after the register has first been cleared of the previous number stored therein. This is required so that the output of register 27 which controls the magnitude of the delay set up in phase shifter 32 can set up the proper delay for each consecutive burst of sinusoid at the frequency $f_0+f_1$.

The magnitude of the phase shift set up in phase shifter 32 for each succesisve burst of sinusoid is determined by the magnitude of the fraction of a complete cycle that the frequency $f_x$ is in at the instant the multiplication proces is initiated. For example, this multiplication will produce a product representing the number and fraction of cycles of $f_x$ that have occurred since initiation of operation. However, the integral number of such cycles is of no interest; only the remaining fraction of a cycle is of interest and serves to control the magnitude of the phase shift set up in phase shifter 32 for each successive burst of sinusoid. Accordingly, phase shifter 32 is controlled by the binary bits to the right of the binary point 33 of the number stored in register 27. In the embodiment illustrated, phase shifter 32 is denoted a $2^p$ position phase shifter and is, accordingly, controlled by the $p$ most significant binary bits past the binary point 33. A suitable phase shifter including six stages is described below with reference to FIGS. 6 and 7. Since this phase shifter includes six stages and six different delay lines, $p$ equals 6. The delay lines can be combined in $2^p$ different ways to produce $2^p$ different phase shifts. These different delays are arranged so that $2^p$ or 64 different phase shifts which range from zero to $2\pi$ radians in increments of $\pi/32$ radians can be set up in the phase shifter. Greater accuracy can be obtained by increasing the number of stages in the phase shifter and thereby decreasing the size of the increments.

All the detail structure of the binary multiplier 25 are not shown. The multiplier, however, might, for example, consist of a bank of gates 34 feeding the number stored in register 22 to multiplier circuits 35 and a bank of gates 36 feeding the number stored in counter 23 to the multiplier circuits 35. These gates 34 and 36 are preferably controlled by the output of PRF generator 26 which also initiates operation of the multiplier. Suitable multiplier circuits are described in "Arithmetic Operations in Digital Computers" by R. K. Richards, published by Van Nostrand in 1955.

The above description relates the general relative capacities of the various digital counters and registers. More specifically, if the computer is to accommodate a total frequency range of plus or minus $2^{17}$ cycles per second with a least significant digit value of one cycle per second, then the number of bits, N, in the frequency command word stored in counter 22 should be made equal to 17 plus an additional bit to denote the algebraic sign. If the smallest phase shift increment is made to be $\pi/32$ radians, as in the example described above, for which $p=6$, then 6 bits are needed for the phase shift command word. In this case, the required clock pulse frequency will be $2^{M+P}$ or $2^{23}$ cycles per second. The maximum useful range of variable frequency afforded may be further limited by the duration $\tau_0$ of the output sinusoid. A reasonable upper limit may be fixed at $1/2\tau_0$ cycles per second.

Figure 5:
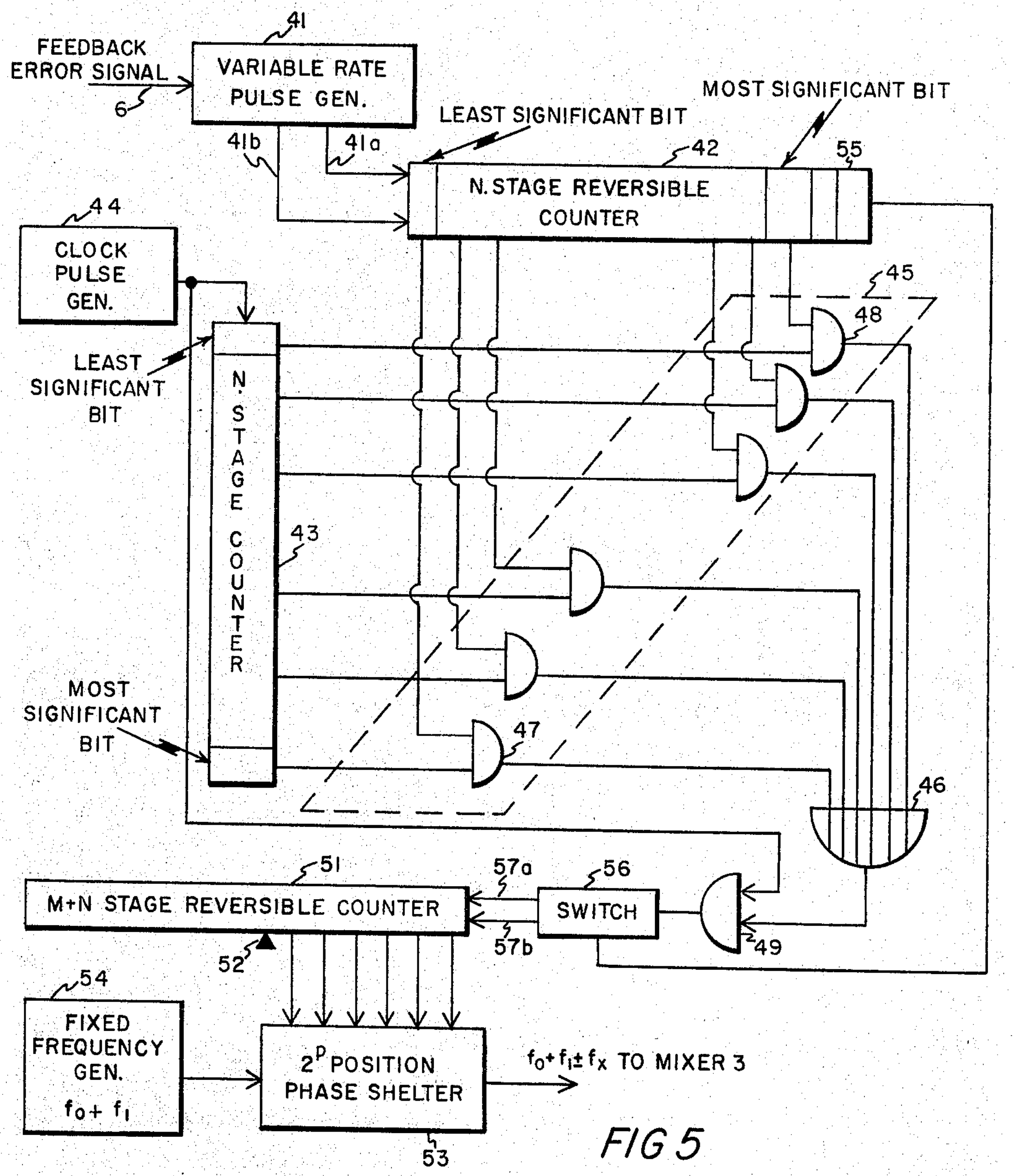
FIG. 5 is a block diagram of a binary computer system for continuously shifting phase of a continuous wave signal at $f_a$ from an oscillator to produce a continuous wave at a frequency $f_b$.

Turning next to FIG. 5, there is shown a computer system somewhat similar to the one in FIG. 4, but capable of shifting frequency of a continuous wave at frequency $f_0+f_1$ produced by a fixed frequency generator. This system includes a variable rate pulse generator 41 responsive to the feedback error signal 6 which represents $\pm f_x$. The output of the variable rate pulse generator 41 appears in one of two lines 41*a* or 41*b* depending upon whether the error signal is positive or negative and is applied to N stage reversible counter 42 which, like counter 22 in FIG. 4, stores a number representative of the integral of $\pm f_x$ and includes an additional bit to represent the sign of $f_x$. Accordingly, counter 42 is of the same type as counter 22.

A second counter 43 is triggered by clock pulse generator 44 and also includes N stages for storing a number representative of time. The outputs of the counters 42 and 43 are combined in a bank of AND circuits 45 and each AND circuit feeds OR circuit 46. The bank of AND circuits 45 is arranged so that each individual circuit is responsive to a bit from counter 42 and a bit from counter 43. For example, the output of the least significant bit in counter 42 couples to the same AND circuit 47 as the output of the most significant bit from counter 43. Similarly, the output of the least significant bit from counter 43 couples to the same AND circuit 48 as the output of the most significant bit from counter 42. In general, the output of the $n^{th}$ significant bit in counter 43 is coupled to the same AND circuit as the output of the $(N-n)^{th}$ bit in counter 42. By this coupling, the pulse rate from clock pulse generator 44 is weighted by the magnitude of the number in counter 42 to produce a pulse rate less than the pulse rate from generator 44 but proportional to the number in counter 42. This weighted pulse rate appears at the output of OR circuit 46.

The pulses in the output of OR circuit 46 produced as described above are not of uniform pulse width and spacing, even though they are at an average recurring rate proportional to the binary number in counter 42. Accordingly, these pulses along with pulses directly from clock pulse generator 44 are fed to AND gate 49 which produces pulses of uniform width and average rate proportional to the binary number stored in the counter 42. These pulses are fed to binary counter 51 which stores a binary number representative of the number and fraction of cycles of frequency $f_x$ which have occurred since initiation of operation. Outputs from the most significant binary bits in counter 51 to the right of the binary point 52 are applied to the multiple position phase shifter 53. If $p$ such binary bits serve to control the phase shifter 53, then the phase shifter will have a capacity for assuming any of $2^p$ different positions. Phase shifter 53 serves to shift the phase of the continuous wave output at a frequency $f_0+f_1$ from fixed frequency generator 54. As a result, the output of the phase shifter which is fed to the mixer 3 is a continuous wave at a frequency $f_0+f_1\pm f_x$.

As mentioned above, counter 42 stores an extra bit representing the sign of the binary number stored therein. This bit, denoted 55, serves to control switch 56 which feeds the pulses from AND circuit 49 to counter 51 through one of two paths, depending upon the electrical state of the switch. If bit 55 is in a state denoting that the number in counter 42 is positive, then switch 56 will feed the output of AND circuit 49 to reversible counter 51 through line 57*a* and if negative, it will feed through line 57*b*. Pulses in line 57*a* will cause reversible counter 51 to count up or forward, whereas pulses in line 57*b* will cause the counter to count down or backward.

Figures 6, 7:
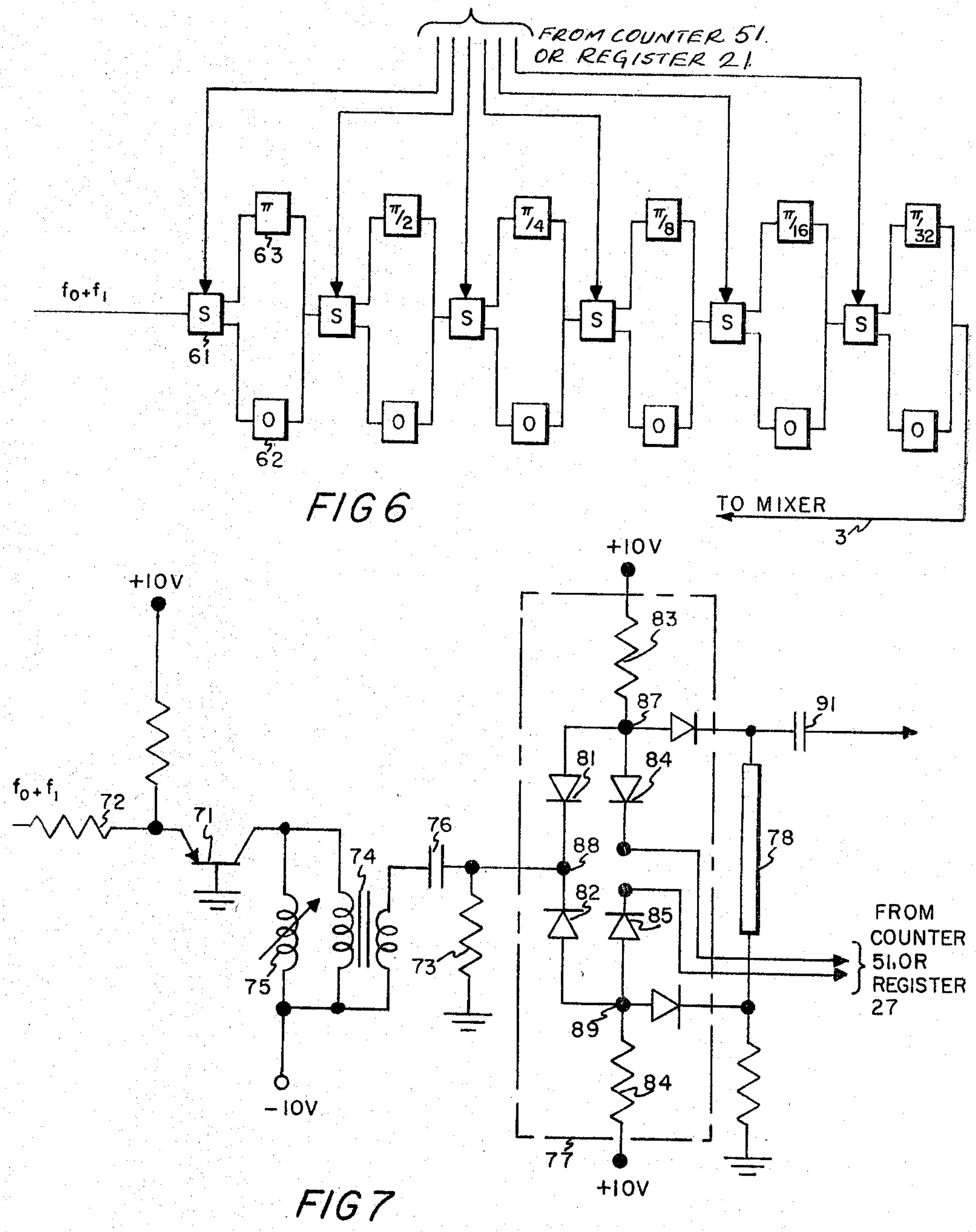
FIG. 6 illustrates a suitable multiple element incremental phase shifter controlled by a binary digital number register.
FIG. 7 is a circuit diagram to illustrate details of one of the elements of the incremental phase shifter.

FIGS. 6 and 7 illustrate a suitable form of the multiple position phase shifters 32 and 53 discussed above with reference to the systems of FIGS. 4 and 5, respectively. These phase shifters are denoted $2^p$ position phase shifters. Accordingly, as shown in FIG. 6, the phase shifter includes $p$ number of stages, each stage including a delay line of suitable magnitude for shifting phase an integral number of $2\pi/2^p$ radians. For example, the phase shifter shown in block diagram form in FIG. 6 includes six stages, and is therefore responsive to the most significant six binary bits past the binary decimal point of the number stored in counter 51 or in register 27. The outputs of each of these six binary bits are applied to a different switch such as switch 61. The switches such as 61 are two position switches and provide a path for the fixed frequency sinusoidal signal produced by generator 28 or generator 54 through a zero phase shifter such as 62 or through a phase shifter such as $\pi$ radian phase shifter 63. The second of these phase shifters is preferably a delay line. The next stage of the variable phase shifter also includes a switch for providing a path through a zero degree phase shifter or a $\pi/2$ radian phase shifter. Subsequent stages include $\pi/4$, $\pi/8$, $\pi/16$ and $\pi/32$ radian phase shifters. Depending on the number stored in the counter to the right of the binary point, any combination of these phase shifters can be achieved.

Thus, any value of phase shift between zero and $2\pi$ radians can be achieved in increments of $2\pi/64$ radians, the total phase shift being directly proportional to the number in counter 51 or register 27 to the right of the binary point.

Each stage in the variable phase shifter described above might, for example, be comprised of the components shown in FIG. 7. FIG. 7 illustrates one suitable circuit including a switch responsive to the output of a binary bit from the counter for switching the sinusoid to one of two paths. One of the paths includes a predetermined delay, and the other path substantially no delay as shown in FIG. 7. The sinusoid at frequency $f_0+f_1$ is applied to the emitter of transistor amplifier 71 via an input impedance 72. The base of transistor amplifier 71 is preferably grounded, and an output is obtained from the collector. The collector output is coupled to output resistor 73 by step-down transformer 74. The output circuit also includes a variable inductance 75 and capacitance 76 by which the output circuit is tuned, preferably to the frequency $f_0+f_1$. Supply voltages are applied to the emitter and collector of equal magnitude but opposite sign, and the same magnitude of voltage is applied to a diode switching circuit 77 which cooperates with the output from transistor 71 as applied to resistor 73 to gate the output around or through the delay 78. The switching circuit 77 includes, for example, diodes 81 and 82 normally biased toward the output resistor 73 as shown. Each of these diodes is forward biased by virtue of the positive supply voltage applied to each via equal resistors 83 and 84. During operation, however, the output from a binary bit in the counter 51 or register 27 is applied to diodes 84 and 85 so that one of these diodes will be forward biased, and the other will be backward biased depending on the binary state of the bit. If, for example, the bit is in the zero state, then diode 85 will be forward biased, and diode 84 will be backward biased. This can be accomplished by coupling each of these diodes in a well-known manner to the binary circuit which stores the binary bit. When diode 85 is forward biased, then resistor 83 will conduct substantially more current than when this diode is backward biased. Accordingly, the voltage drop across resistor 83 will be substantially greater, and the potential at junction 87 will fall below the potential at junction 88 with the result that diode 81 will cease conducting. On the other hand, at the same time, diode 85 will be back biased, and the potential at junction 89 will be substantially more than the potential at junction 88 with the result that diode 82 will continue to conduct. Thus, the state of the binary bit in the counter or register determines which of diodes 81 or 82 will conduct. If diode 82 conducts, the sinusoid signal will be delayed by delay 78, whereas if diode 81 conducts it will not. Capacitance 91 provides coupling between the stages. The output of the circuit shown in FIG. 7 is applied to the next stage which is constructed identically, but is controlled by the next least significant binary bit stored in the counter.

This completes a description of a few embodiments of the present invention, each including a fixed frequency generator with computing circuitry controlling phase of the output of the generator to produce a signal which at least appears to differ in frequency from the fixed frequency by a controlled amount. Generally, the embodiments include circuitry for very accurately controlling frequency to a degree not heretofore possible and other types of digital computing circuits could be substituted for the circuits shown herein to accomplish substantially the same computation without deviating from the spirit and scope of the invention as set forth in the accompanying claims.

What is claimed is:

1. A variable frequency generator comprising:
a first source of frequency;
a second source of frequency;

means for counting the cycles of said frequency from said second source;
means for varying the phase of said frequency from said first source;
and means coupling said counting means to said means of varying phase to vary the frequency from said first source.

2. A variable frequency generator comprising:
a first source of frequency;
a second source of frequency
means for counting the cycles of said frequency from said second source
means for varying the phase of said frequency from said first source;
and means coupling the output of said counting means to said means for varying phase to progressively shift the phase of said frequency from said first source.

3. A variable frequency generator comprising:
a source of fixed frequency;
a source of variable frequency;
means for counting the cycles of said variable frequency;
means for varying the phase of said fixed frequency;
and means coupling said counting means to said means for varying phase to control the phase of said fixed frequency.

4. A variable frequency generator comprising:
a source of fixed frequency;
a source of variable frequency;
means for counting the cycles of said variable frequency;
means for varying the phase of said fixed frequency;
and means coupling the output of said counting means to said means for varying phase to progressively shift the phase of said fixed frequency.

5. A variable frequency generator comprising:
a source of fixed frequency;
a source of variable frequency;
means for counting the cycles of said variable frequency;
means for shifting phase of said fixed frequency by successive increments;
and means coupling the output of said counting means to said means for shifting phase to control the amounts of said successive phase shift increments.

6. A variable frequency generator comprising:
a source of fixed frequency;
a source of signal representative of frequency shift;
means responsive to said last mentioned source for producing a pulse rate indicative of the signal therefrom;
means for counting said pulses; and
a phase shift network responsive to said counting means for shifting phase of said fixed frequency.

7. A variable frequency generator comprising:
a source of fixed frequency;
a source of signal representative of frequency shift;
means responsive to said last mentioned source for producing a pulse rate indicative of the signal therefrom;
means for counting said pulses; and
a phase shift network responsive to said counting means for incrementally shifting phase of said fixed frequency.

8. A variable frequency generator comprising:
a source of fixed frequency;
a source of signal representative of frequency shift;
means responsive to said last mentioned source for producing a pulse rate indicative of the signal therefrom;
means for counting said pulses and storing a number representative of said count; and
a phase shift network responsive to said stored number for shifting phase of said fixed frequency.

9. A variable frequency generator comprising:
a source of fixed frequency;
a source of signal representative of frequency shift;
means responsive to said last mentioned source for producing a pulse rate indicative of the signal therefrom;
means for counting said pulses and storing a number representative of the number and fraction of cycles of said frequency shift;
and a phase shift network responsive to the magnitude of said stored fraction for shifting the phase of said fixed frequency.

10. In combination:
a first source of frequency signals;
a second source of frequency signals of fixed frequency;
a source of pulses each having a pulse period;
counter means coupled to said source of pulses for determining the number of whole cycles plus fractions of a cycle through which said first source of signals passes during one of said pulse periods;
and means coupled to said counter means for varying the phase of said frequency signals from said second source.

11. A frequency generator for providing an output signal which differs in frequency from a signal of unknown frequency and known pulse repetition period by a fixed amount comprising:
a fixed frequency means for producing a signal of known frequency;
a source of signals having the pulse repetition period of said signal of unkown frequency;
gating means coupled to said source of signals and coupled to said fixed frequency means for producing bursts of sinusoid at the fixed frequency;
means responsive to said signal of unknown frequency and coupled to said source of signals for producing a signal indication representing the remaining fractional part of a whole number of cycles through which said signal of unknown frequency has passed during a pulse repetition period;
and phase shifter means coupled to said means for producing a signal indication and coupled to said gating means for shifting the phase of said bursts of sinusoid an amount proportional to the remaining fractional part of a whole number of cycles through which said signal of unknown frequency has passed during the pulse repetition period.

References Cited by the Examiner

UNITED STATES PATENTS

| | | | |
|---|---|---|---|
| 2,405,771 | 8/1946 | Ziegler | 331—25 |
| 2,490,500 | 12/1949 | Young | 331—25 |
| 2,706,785 | 4/1955 | Volz | 331—156 X |
| 2,774,872 | 12/1956 | Howson | 331—27 |
| 2,777,951 | 1/1957 | Charlton | 331—178 X |

ROY LAKE, *Primary Examiner.*

J. B. MULLINS, *Assistant Examiner.*